Patented May 15, 1945

2,375,756

UNITED STATES PATENT OFFICE 2,375,756

CATALYSIS

John R. Bates, Swarthmore, Pa., assignor to Houdry Process Corporation, Wilmington, Del., a corporation of Delaware No Drawing. Application September 9, 1941, Serial No. 410,165

4 Claims. (Cl. 196—52)

The present invention relates to the conversion of hydrocarbons, for example, hydrocarbon fractions obtained or derived from petroleum or other hydrocarbonaceous or carbonaceous materials in the presence of specific catalysts. One of its specific applications is the use of the catalysts in the production of valuable hydrocarbon products having distillate characteristics including stable, high anti-knock fractions valuable for use as or in motor fuels.

The catalysts are synthetically prepared composites containing precipitated or coagulated silica, alumina and zirconia in intimate association. They are further characterized in part by high activity in promoting formation of hydrocarbons or fractions boiling within the boiling range of gasoline, by selectively promoting formation of stable products of high anti-knock value, by their tendency to form comparatively small quantities of heavy undistillable products which accumulate as catalyst deposits, by their ability to maintain their catalytic properties for long periods under severe conditions of use including a multiplicity of regenerations by combustion to remove burnable deposit.

According to a specific and preferred embodiment of the invention, ordinarily liquid hydrocarbons, for example, a distillate fraction having components boiling within and/or above the boiling range of gasoline, are subjected to conditions promoting splitting reactions, for example, conditions suitable for dehydrogenation and/or cracking, in the presence of such composites prepared by calcination of intimately associated silica, alumina and hydrous zirconia. To obtain to fullest advantage activity, selectivity and refractory character of the composites they should be free or substantially so of alkali metal utilized in the production of the silica and/or either or both of the other precipitated oxides.

In practice of certain aspects of the invention, distillable hydrocarbon fractions, for example, ordinarily liquid fractions such as low anti-knock, heavy or light naphtha, or a light or heavy gas oil, or a long residuum or topped petroleum crude may be processed at reforming or cracking temperature and at pressure suitable for maintaining the material in vapor phase during contact with the catalyst. Long catalyst life and higher yields of liquid products are usually obtained by utilization of composites comprising a major proportion of silica and minor proportions of alumina and of zirconia. The calcined composite should contain, however, a substantial quantity of alumina, usually at least 2% by weight and preferably above 3% by weight. When the alumina content exceeds about 40%, the catalyst, although still possessing substantial and even high activity, sometimes produces lower yields of high anti-knock products than when lower quantities of alumina are employed. To obtain the benefits of the process it is not necessary that the composite comprise large proportionate quantities of zirconia. In fact, the desired catalytic properties are emphasized in composites containing this material in amounts not in excess of about 20% by weight, as for example, from 0.5% to about 15%. For most ordinarily liquid or vaporizable charging stocks, it is preferred to employ catalyst containing at least 4 mols and preferably at least 10 mols of silica for each mol of zirconia and each mol of alumina (10:1:1), as up to 25 or 30 mols of silica for each mol of either or both of the other oxides.

The composites of silica, alumina and hydrous zirconia may be prepared by a number of alternative methods characterized by common features which tend to develop the properties desired in the finished contact mass.

According to one method, hydrous zirconia may be deposited on or composited with hydrous silica and hydrous alumina. One way of doing this is to produce the three oxides from the same aqueous menstruum as by interaction in solution of an alkali metal silicate, an aluminum compound, and a zirconium compound, to produce a hydrous composite which upon drying, with or without preliminary washing to freedom from water soluble reaction products, is a zeolite containing silica, alumina, and zirconia as nuclear components and exchangeably holding alkali metal. Another method is to deposit hydrous zirconia on composited silica and alumina prepared, for example, by coprecipitation or coagulation of silica and alumina or by compositing separately prepared hydrogels of gelatinous precipitants of silica and alumina.

According to the latter method, the deposition may be effected by mixing silica-alumina composites in hydrous or comminuted dried condition with precipitated hydrous zirconia or by treatment of such a composite of silica and alumina with a solution of a zirconium compound will deposit or may be treated to deposit precipitated hydrous zirconia. For example, the hydrous or dried silica-alumina may be impregnated or mixed with a solution of a hydrolyzable salt of zirconium as, for example, zirconium sulphate, zirconium nitrate, zirconium oxychloride, etc., and then, if necessary, subjected to heat or other treatment to accelerate or complete formation and deposition of hydrous zirconia. Alternatively, the composite may be impregnated with a solution of a zirconium compound and treated with a suitable basic precipitant, preferably a compound of a volatile or heat unstable cation, for example, ammonium hydroxide or an amine. Conversely, the silica-alumina composite may be impregnated with the precipitant and thereafter contacted with the zirconium bearing solution. In the practice of this method, better results are obtained when the composite of silica and alumina, as presented for deposition of hydrous zirconia thereon, is a zeolite. At the time of deposition of hydrous zirconia, thereon, the zeolite may exchangeably hold alkali metal or it may have been freed of alkali metal as, for example, after the manner hereinafter described.

Another method is to composite separately prepared hydrous silica, hydrous alumina and hydrous zirconia. The hydrous materials may be combined after being washed to freedom from soluble compounds thus producing directly a composite which is free of alkali metal. It is preferred, however, that the hydrous oxides be so combined that the resulting composite has the structure and other characteristics of a zeolite. One method of thus producing a zeolite is to present silica hydrogel to the compositing step in substantially its original hydrous condition, that is, without intervening washing. Alternatively or additionally, hydrous alumina and/or hydrous zirconia containing alkali metal oxide and resulting from the production of either or both of these materials by reaction involving the use of alkali metal compounds, such, for example, as an alkali metal aluminate or a precipitant comprising an alkali metal cation, may be presented to the compositing step.

In each of the foregoing methods the composite, as prepared, contains zirconia in hydrous state. Another feature of great importance is that the composited silica, alumina and zirconia, as presented to the hydrocarbon treatment, should be free or substantially so of alkali metal. To develop fully the activity and other desired characteristics of catalyst, it should contain no more alkali metal than that chemically equivalent to 0.5% by weight of sodium oxide, and for best results should contain less than three-fifths of this amount. When the precipitated oxides, at the time of their combination, are substantially free of alkali metal it obviously follows that the composited materials are also free of alkali metal. Such is the case, for example, when silica hydrogel washed free of alkali metal is composited with hydrous alumina and hydrous zirconia prepared in the absence of alkali metal or washed free of the same. Such composites are ready for calcination without further treatment.

Certain of the above-described methods, as has been described, result in zeolites whose nuclei are composed of or contain silica, alumina and zirconia. The zeolites yield superior catalysts, and, in order that their catalytic properties be fully developed, it is usually necessary to subject them to chemical purification to remove alkali metal. Thus, according to the preferred aspects of the invention, zeolites containing silica, alumina and zirconia are produced and thereafter subjected to treatment with a chemical agent which reduces their content of alkali metal to or below 0.5% sodium oxide or equivalent and preferably effects substantially complete removal of alkali metal oxide. The most satisfactory alkali metal removal consists of a base exchanging step, preferably employing as base exchanging medium a solution of a compound of a volatile or heat unstable cation which, after substitution for the alkali metal, is driven out of the zeolite upon subsequent calcination to leave a finished catalyst composed of the substantially pure nucleus of the zeolite. Typical compounds which may thus be used are ammonium compounds or amines, for example, salts such as ammonium chloride, ammonium sulphate, ammonium nitrate, or methyl or ethyl amine hydrochloride.

Mild treatment of the zeolites with acid sometimes results in an improved product, but acid treatment sufficiently drastic to effect substantially complete removal of alkali metal often adversely affects the activity, refractoriness, or both, of the zeolitic nucleus. On the other hand, a base exchange step such as that described above rarely, if ever, has any deleterious effect on the desired properties of the finished catalyst.

In order to insure substantially complete removal of alkali metal from zeolites such as those produced by coprecipitation and having nuclei consisting of silica and alumina, or of silica, alumina and zirconia, the zeolite forming reactions should be conducted with solutions containing an anion of a non-amphoteric element equivalent to at least 0.2 and preferably at least 0.5 the total alkali metal oxide content of the reaction mixture, as set forth, for example, in my copending applications, Serial No. 170,648, filed October 23, 1937, and Serial No. 174,966, filed November 17, 1937, which have now been issued as United States Patents Nos. 2,283,172 and 2,283,173. Quantities of anion at least equivalent to the alkali metal of the solutions insures easy and substantially complete elimination of alkali metal from the zeolite. In many instances the alkali metal content of the zeolite is substantially completely removable by base excahnge when the precipitation is effected and completed at pH of 11 or below and preferably not in excess of about 10, as within the range of 3 to 10. Accordingly, in practice of the invention involving catalyst produced by coprecipitation methods, the coprecipitation is effected in the presence of such quantity of a suitable anion, for example, the chloride anion, the sulphate anion, the acetate anion or the nitrate anion.

The requisite quantity of nonamphoteric anion may be provided in its entirety by the compounds selected for interaction with the alkali metal silicate as, for example, by utilization of soluble aluminum salts and/or zirconium salts, or it may be provided at least in part by inclusion within or addition to the reaction mixture of a suitable anion bearing compound, for example, an acid or a salt. When salts are employed it is preferable that they be of a volatile or heat unstable cation, for example, of ammonium or an amine.

Thus, for example, silica-alumina-zirconia zeolites may be prepared by interaction of a soluble silicate and soluble aluminum and zirconium salts. When this type of reaction is employed, the desired and valuable properties are more pronounced, when the quantity of salt, together with any additional anion bearing compound, is controlled to produce a coagulant or precipitant of pH not in excess of about 8 and preferably of 7 or less. Highly desirable catalyst may, however, be produced under conditions of greater alkalinity. One method often tending to produce alkaline reaction conditions is utilization of alkali metal aluminate as the source of alumina.

The necessary quantity of anion then must come from a source extraneous to the silicate and aluminate solutions. It may be provided in part by zirconium salt solution. Often, however, in producing catalyst containing minor proportionate quantities of zirconia, it is necessary to supplement such zirconium compound with a suitable anion bearing compound, for example, an acid or a salt. In such instances the desired catalytic properties are obtained from zeolites produced by formation of silica-alumina sols by mixing of the alkali metal silicate and aluminate solutions, and by precipitation or coagulation of the sol, for example, after the manner set forth in my aforesaid Patent No. 2,283,173, by interacting the same with a solution of a compound bearing the necessary anion. Such solution may contain zirconium salt, or the latter may be separately added to the mixture before or after addition to the sol of a supplementary anion bearing compound. Excellent catalysts are derived from alkaline gels or gelatinous precipitates produced by interaction of such silica-alumina sols with a solution or solutions containing zirconium salt and a compound, preferably a salt of a volatile or heat unstable cation, which compound reacts by metathesis with the alkali metal oxide content of the sol to produce a salt and a weak base. Thus, for example, the sol may be reacted with a solution of zirconium salt and an ammonium or amino salt selected from the group, ammonium chloride, ammonium nitrate, ammonium sulphate, ammonium acetate, and methylamine or ethylamine hydrochloride.

In practicing the aspects of the invention involving the production of hydrous composites having zeolitic properties, desired catalytic properties and catalyst efficiency are developed to fuller extent by drying the hydrous or gelatinous composite while it retains all or substantially all water and water soluble materials contained within the structure of the gelatinous composite at the time of its formation, i. e., before any washing or base exchange step. The drying temperatures employed are moderate, involving, for example, temperatures not in excess of about 400° F. Before the base exchange step is effected it is preferred to wash the resulting dry, hard, zeolite free or substantially so, of the contained water soluble materials such as alkali metal salts and excessive free alkali metal oxides. When the gelatinous material is dried in substantially its original condition, the final product, in addition to possessing the highly desirable catalytic properties, is light yet strong, and possesses a highly porous and open structure well adapted for passage and diffusion of gases and vapors into and through the same.

The composite consisting essentially of silica. alumina, and zirconia and free or substantially so of alkali metal may be subjected to calcination before contacting it with the hydrocarbon reactants. The calcination step preferably involves utilization of temperatures sufficiently high to drive off any volatile or heat unstable cation which may be exchangeably held or absorbed in the zeolite and also to destroy or reduce base exchange properties possessed by the composite up to this point, thereby to produce a catalyst composed solely of the nucleus of a zeolite or of such a nucleus containing deposited zirconia. To effect these results, temperatures at least as high as 700° F. should be employed and it is preferable to employ temperatures at least as high as those encountered during subsequent use in contact with hydrocarbon reactants or during regeneration by controlled combustion. In most cases it is better to employ calcination temperatures of at least 800° F. and preferably 900° F. or higher.

If desired, preparation of the zeolite may include mild acid treatment effected before the calcination step. Such treatment, which often beneficially affects the selectivity and refractory character of the catalyst, should, for best results, be conducted on the dried zeolite after removal of alkali metal. Such treatment may effectively and advantageously be combined with deposition of hydrous zirconia upon the silica-alumina zeolite. To this end, the zeolite may be immersed in or otherwise contacted with a solution of a zirconium salt, many of which, including zirconium sulphate, zirconium oxychloride and zirconium nitrate are sufficiently acid to effect the desired treatment. Alternatively, the silica-alumina zeolite may be immersed in other acid reacting or acidulated zirconium-bearing menstruum, as for example, a zirconia gel or sol containing a small quantity of free acid.

It is characteristic of the catalysts embraced within the scope of the invention that they are exceptionally stable to heat, being capable of maintaining desired activity for long commercial life involving repeated and frequent regenerations by combustion of burnable deposit. Over and above these advantages, which directly provide improved and more economical plant operation, these catalysts, despite being highly active in promoting splitting and kindred decomposition reactions, possess highly selective activity which direct the course of decomposition reactions toward products possessing a high degree of stability and marked anti-detonating characteristics. Motor fuels produced by their use under decomposition conditions, even without further purification, characteristically have high resistance to oxidation and other deteriorating influences encountered in storage and use, as measured, for example, by oxygen bomb induction periods, accelerated gum determinations, color stability tests, etc. In fact, these motor fuels are unique among those resulting from splitting and other decomposition reactions in that they possess the peculiar type of stability required of modern aviation gasolines and currently indicated by standardized acid heat or bromine number determinations. Utilizing a wide variety of charging stocks ranging from crude distillation residues to naphthas having boiling range characteristics of gasoline and including cracked and other naphthas of high acid heat, gasolines made according to the invention have acid heats of 60° F. and below and usually 40° F. or below.

The splitting reactions are preferably conducted in vapor phase. For most charging stocks catalyst temperatures within the range of 700 to 1050° F. are suitable, temperatures within the lower portions of the range, as up to 950° F. being usually employed for the transformation of high boiling hydrocarbons, and temperatures within the upper portion of the range, or 800° F. and higher, for kerosenes and other naphthas. It is preferable to employ comparatively low pressures, as from atmospheric up to 150 or 200 lbs. per sq. in. gauge. Pressures of about 30 lbs. per sq. in. gauge and up are of some advantage in transforming the more refractory naphthas and similar charging stocks, but it is preferred to use pressures below about 100 lbs. per sq. in. for transformation of higher boiling hydrocarbons such as gas oils and bottoms fractions. The feed rates for ordinarily liquid hydrocarbons usually lie within or above the range of 0.75 to 5 volumes of liquid charge to each volume of catalyst per hour.

The following examples are illustrative only of the invention and its practice, and are not to be construed as limiting upon its scope.

EXAMPLE 1

A hydrous composite containing silica, zirconia and alumina in the approximate molar ratio of 15:0.9:1 was prepared as follows. About 22.5 kilograms of a solution of commercial sodium silicate having a specific gravity of about 1.4 and diluted with about 8 liters of water was mixed with approximately 3.5 liters of ammonium hydroxide solution having a specific gravity of 0.9. To this mixture there was added a second solution made up of approximately 3.5 kilograms of commercial aluminum sulfate dissolved in about 50 liters of water mixed with about 6.5 liters of a solution of about 2 kilograms of zirconium sulfate. Within a minute an all embracing gel having a pH value of about 5.7 set up. This gel was dried, washed and treated with an ammonium chloride solution until the total sodium oxide content was reduced to below 0.5%. This product was divided into two portions.

One portion was heat treated at about 1050° F. for two hours and was utilized to promote gasoline formation from an East Texas gas oil of the following properties:

*Engler distillation*

| | |
|---|---|
| Int. | 440 |
| 5 | 464 |
| 10 | 484 |
| 20 | 498 |
| 30 | 510 |
| 40 | 522 |
| 50 | 534 |
| 60 | 550 |
| 70 | 572 |
| 90 | 646 |
| 95 | 704 |
| Dry | 724 |

| | | |
|---|---|---|
| A. P. I. gravity | | 36.0±0.3 |
| Sulphur | | 0.3 |
| Pour | ° F | 35± 5 |
| Flash (open cup) | ° F | 220±10 |
| Fire | ° F | 250± 5 |
| S. U. vis./100 | | 40± 3 |
| Conradson carbon | | 0.03 |
| Aniline point | ° F | 165±2.5 |

This gas oil was fed in vapor form to the catalyst at a rate of about 1.5:1 volumes of gas oil to each volume of catalyst per hour for an operating period of approximately 10 minutes while maintaining the catalyst at about 785° F. The fractionated 400° F. end point gasoline obtained from the reaction products was found to amount to approximately 52% by volume of the gas oil charge. Upon analysis, the coke-like deposit on the catalyst was found to be less than 1.9% by weight or approximately 13 grams per liter of catalyst and was removed within a 10 minute burning period conducted at maximum temperature of 1100° F. Upon extensive use this catalyst maintained its ability to form high yields of gasoline product, but its tendency to accumulate coky deposit decreased.

The other portion of this catalyst was subjected to heat treatment at about 1400° F. for 2 hours. When used in a process for producing 400° F. end point gasoline utilizing the same charging stock and substantially the same operating conditions as for the first portion of the catalyst, it was found that substantially the same quantity of gasoline product was obtained. The catalyst deposit, however, was found to be approximately 1% by weight or about 7 grams per liter.

The gasoline recovered in both the above runs had octane ratings in excess of 76 (C. F. R. motor method). Each gasoline had an acid heat value below 60° F. along with low copper dish gums and long oxygen bomb induction periods.

A typical illustration of the effectiveness of this catalyst in promoting transformation of low octane naphthas into high octane product is as follows. A heavy naphtha having a boiling range of the order of 280 to 450° F. and an octane rating of about 35 and obtained from East Texas crude was fed to the second portion of the catalyst at the rate of about 1.25:1 under pressure of the order of 50 lbs. per sq. in gauge for a run of 20 minutes duration during which the catalyst was maintained at about a temperature of 820° F. The 400° F. end point gasoline separated by fractionation and condensation from the vapors issuing from the reaction zone was found to be equivalent to about 60% by volume of the fresh charge. Upon analysis, this gasoline had an octane rating of about 70 and the color and stability characteristics which typically result from practice of the invention. The coky deposit on the catalyst was of the order of 0.8% of its weight or about 5.5 grams per liter. This deposit was easily removable in a 10 minute burning period.

EXAMPLE 2

A series of three catalysts each consisting essentially of the substantially pure nucleus of a silica-alumina-zirconia zeolite was prepared, each catalyst containing a different minor proportion of zirconia. In each instance, the catalyst was obtained from a composite of hydrous silica, hydrous alumina and hydrous zirconia prepared by interaction of a stream of silica-alumina sol with streams of zirconium sulphate solution and ammonium sulphate solution mixed therewith in rapid succession under conditions of turbulent flow to produce an alkaline gelatinous composite which was dried at temperature in the range of 160 to 220° F., the zeolite washed free of water soluble substances, and then base-exchanged with a solution of ammonium sulphate until its total content of sodium oxide was reduced to below 0.3% by weight. After calcination each composite was utilized to promote cracking of a heavy East Texas bottoms fraction having boiling range of 490 to 945° F. and A. P. I. gravity of 28.6° in recurring cycles of on-stream and regeneration periods. During the on-stream periods which were of ten minutes' duration the bottoms, in vaporized condition, at pressure of about 8 lbs. per square inch gauge, and mixed with about 15% of their weight of steam, were fed to the catalyst at the rate of about one volume of liquid bottoms per hour for each volume of catalyst while maintaining the latter at temperature of about 850° F. During regeneration periods the coky catalyst deposit was removed by combustion at controlled temperature within the approximate range of 800 to 1100° F. The products which issued from the catalyst during the on-stream periods were fractionated into 410° F.

end point gasoline, a clean gas oil valuable for use as distillate fuel or as cracking stock, and a rich gas fraction containing substantial quantities of unsaturated and branched chain compounds.

To prepare the first hydrous composite about 85 parts by weight of commercial sodium silicate solution containing about 28.5% $SiO_2$ and 9% $Na_2O$, after dilution with about 36 parts by weight of water, was mixed with about 4.3 parts by weight of solid commercial sodium aluminate containing about 55% by weight of alumina dissolved in approximately 94 parts by weight of water. The resulting sol was reacted with about 27.5 parts by weight of commercial zirconium sulphate solution. ($ZrO_2$ content of about 16% and $SO_4$ content of about 27% by weight) diluted with about 10.3 parts by weight of water and about 19.8 parts of $(NH_4)_2SO_4$ dissolved in about 29.4 parts of water to produce a gel having pH of about 9.2. After drying, washing, and base exchanging, the zeolite was calcined for about 4 hours at temperature of about 1200° F. in an atmosphere of steam. The resulting catalyst, composed essentially of about 81.5% $SiO_2$, 8.3% $Al_2O_3$ and 10% $ZrO_2$ and containing of the order of 0.25% $Na_2O$, yielded, when cracking the above described heavy bottoms, about 48% by volume of the charge of a 410° F. end point gasoline having octane rating (C. F. R. research method) of about 91 or about 80 (C. F. R. motor method) together with 45.5% by volume of a clean fuel having distillate characteristics. The coke deposit on the catalyst amounted only to about 3.7% and the rich gas to about 10.7% by weight of the charge.

To produce the second composite a silica-alumina sol prepared by mixing with about 185 parts of water about 121 parts and 6.25 parts respectively, of the same sodium silicate and sodium aluminate as described for the first composite of this example was reacted in the manner described with about 16.5 parts of the said commercial zirconium sulphate solution diluted with about 33 parts of water and approximately 28.2 parts of ammonium sulphate dissolved in about 40.6 parts of water. The resulting gel, having pH of about 9.5, after the drying, washing base exchange and calcination steps employed with the first catalyst of the series, was subjected to test. This catalyst, consisting essentially of about 85% $SiO_2$, 9.4% $Al_2O_3$ and 5.3% $ZrO_2$ (its content of $Na_2O$ being about 0.28%) produced about 46% by volume of gasoline of about 89 octane (C. F. R. research method) or about 80 (C. E. R. motor method) with an approximately equal volume of distillate fuel oil or cracking stock. The coke produced as catalyst deposit was only about 4% and the rich gas about 10.5% by weight of the charge.

The third composite of this series was a gel of about 9.6 pH prepared after the manner of the first two composites, the silica-alumina sol containing about 126 parts and 6.5 parts of the sodium silicate and sodium aluminate described together with about 192 parts of water. The zirconium sulphate solution contained about 37 parts of the described commercial solution and about 41 parts of water while the ammonium sulphate solution was made up of about 29 parts of this salt and about 42 parts of water. After drying, washing, base exchange step and calcination substantially as employed with the other two composites, this composite, on test, produced about 46.5% by volume of the charge of gasoline of about 80 octane (C. F. R. motor method), an approximately equal volume of distillate fuel, and of the order of 10% by weight of gas. The coke deposit was only about 3.6% by weight of the charge.

From this example it is evident that catalysts of the invention produce only small quantities of coky deposit even when utilized to promote cracking of heavy charging stocks which tend to decompose readily into products which are coky in nature. The gasolines produced possessed the low acid heat and low gum content and other properties characteristic of the highly stable gasolines produced according to the invention.

Also, the catalysts of the invention tend to produce only small quantities of coke when more refractory hydrocarbon fractions are cracked or reformed in their presence. Thus, a catalyst produced by calcination of a composite free of alkali metal prepared from the reactants and under the conditions set forth for the third catalyst of this example promoted production of about 54% by volume of a gasoline having octane rating of about 80 (C. F. R. motor method) together with only about 3.5% of coke by weight, from a heavy naphtha charge having an aniline point of about 136° F., an octane rating of about 33.5 (C. F. R. motor method) and a boiling range of about 420° F. to 520° F. These results were produced in an operating cycle involving ten minute runs when the catalyst was held at about 875° F. while the naphtha was fed thereto under pressure of about 40 lbs. per square inch and at a rate of the order of one volume of naphtha per volume of catalyst per hour.

EXAMPLE 3

A catalyst consisting of the substantially pure nucleus of a silica-alumina-zirconia zeolite was prepared from the solutions prepared as follows.

1. 57.5 parts by weight of commercial sodium silicate as described in Example 2 were diluted with about 45.5 parts of water.

2. About 3 parts of solid sodium aluminate such as described in Example 2 were diluted with about 63 parts of water.

3. About 5 parts by weight of $ZrOCl_2$ and about 11 parts of $NH_4Cl$ were dissolved in about 42 parts of water.

Solutions 1 and 2 are mixed to form a sol into a stream of which solution 3 was injected. Practically immediately a gel having pH of about 9.2 and embracing practically all the constituents of the mixture was formed. This gel, in unwashed condition, was dried at about 200° F. and water washed until substantially free of water soluble substances. Then the washed hard material was base exchanged with a solution of $NH_4Cl$ until substantially free of sodium oxide. Then, after calcination at about 1400° F. for a period of about 10 hours in a stream of air containing 5% by weight of steam, the catalyst, which contained about 82% $SiO_2$, 9% $Al_2O_3$ and 9% $ZrO_2$ and of the order of 0.08% $Na_2O$, was utilized to promote cracking of the gas oil described in Example 1 under substantially the same conditions. The gasoline produced which had an octane rating of about 80 (C. F. R. motor method) and acid heat of about 36° F. amounted to about 45.5% by volume of the gas of the gas oil charge. An approximately equal volume of light gas oil having a boiling range approximating that of the charge was produced together with about 2.9% by weight of coke and 5.4% by weight of gas.

EXAMPLE 4

A silica-alumina zeolite with substantially all its sodium replaced by ammonium was prepared in the following manner:

About 106 parts by weight of commercial sodium silicate solution such as described in Example 2 was diluted with about 47 parts of water and mixed with a solution of 8 parts of sodium aluminate dissolved in 170 parts of water to form a sol which was coagulated by mixing in about 27 parts of ammonium sulphate dissolved in about 83 parts of water. The gel which formed practically immediately, after drying at temperature of the order of 200° F. and washing to substantial freedom of soluble salts, was base-exchanged with a solution of ammonium sulphate until substantially free of sodium oxide.

About 1 part by weight of the resulting ammonium containing zeolite in the form of granules was immersed for about an hour in a solution of 0.3 part by weight of $ZrOCl_2.8H_2O$ dissolved in 2 parts of water. The granules then were washed with water and dried at about 200° F., whereupon then were calcined for about 10 hours at temperature of approximately 1400° F. in an atmosphere of air containing 5% steam. The calcined material, when utilized to crack the gas oil described in Example 1 under substantially the same conditions, produced about 49% by volume of gasoline of about 79 octane (C. F. R. motor method) having acid heat of about 28° F.

Another 13 parts by weight of the granules of the ammonium containing zeolite were immersed in a solution of $Zr(SO_4)_2$ prepared by diluting about 17.5 parts by weight of the commercial solution described in Example 2 with about 13.2 parts of water. After 15 minutes a part of the granules were taken from the solution, washed with water and calcined at about 1400° F. for 10 hours in an atmosphere of air containing about 5% by weight of steam. When 5 hours had elapsed the zirconium sulphate solution was drained from the remainder of the zeolitic granules and the latter subjected to the same treatment as the part previously withdrawn. The two parts of zeolite containing deposited zirconia were then utilized to crack the same gas oil as described in Example 1 under substantially the same conditions. The portion which was withdrawn in 15 minutes produced about 38.5% of gasoline of about 80 octaine (C. F. R. motor method) and acid heat of about 55° F. together with about 3.9%, and 1.7% by weight of gas and coke, respectively. The portion which remained in contact with the zirconium sulphate solution for 5 hours yielded about 44% of gasoline of about 80 octane (C. F. R. motor method) and acid heat of about 39° F. The gas produced by this catalyst was about 3.8% by weight and the coke about 1.8%.

In order to facilitate regeneration it is preferable that the catalyst be presented to the reactants in the form of grains or shaped pieces of substantially uniform size and shape. To this end, the catalytic gel may be molded into cylinders, pellets or any other desirable shape at any desired stage of their manufacture or treatment. In the interest of utilizing, unimpaired, the activity and stability of the synthetic catalytic product it is preferred that the molding operation be conducted without the aid of extraneous binding materials containing or comprising sodium or other alkali metal. One molding method which avoids the use of extraneous binders is that disclosed in United States Patent No. 2,146,718 to George R. Bond, Jr., dated February 14, 1939, which reissued as Patent No. Re 21,690 on January 14, 1941.

The high anti-knock rating, stability and other valuable properties of products of the invention are probably due to the fact that the selective catalysts promotes formation of stable branch chain paraffins to the exclusion, or substantially so, of reactions which terminate with the formation of olefins or which convert straight chain to ring compounds. The products, whether derived from naphthenic or paraffinic base starting materials are predominantly paraffinic with the branched chain paraffins preponderating, often in molar ratios as high as or higher than 4:1 over the straight chain compounds; in fact, their content of branch chain paraffins usually exceeds their content of any other type of hydrocarbons.

When the charging stock contains refractory sulphur components, such components are converted into easily removable form, the resulting stable motor fuel often being capable of meeting market specifications for sulphur content and of passing accepted corrosion tests without being subjected to further purification, except possibly a suitable treatment to remove traces of hydrogen sulphide, for example, a light caustic wash. In addition, when the charge subjected to the selective splitting action of the catalyst is a naphtha, the resulting product having low acid heat and improved octane rating is more respective than the charge to addition agents such as tetraethyl lead.

In order to provide continuous flow of reactants to and of reaction products from a plant a plurality of converters is preferably employed, each utilized alternately on stream and in regeneration and operated in coordination or in cycle so that the stream of reactants may be transformed from one converter at the end of an operating period therein to another converter which has completed the regeneration phase of the alternating operation. Desired converter temperatures during either or both of the on-stream and regeneration phases of the cycle may be maintained with the aid of an extraneous heat exchange medium, for example after the manner disclosed in U. S. Patent No. 2,078,947, issued May 4, 1937, to E. J. Houdry et al., in the copending application of E. J. Houdry and T. B. Prickett, Serial No. 261,728, filed March 14, 1938, issued as United States Patent No. 2,283,208, or in my copending application Serial No. 308,193, filed December 8, 1939, now issued as United States Patent No. 2,273,826. By preference, the regenerating medium is maintained under superatmospheric pressure which may be up to say 150 lbs. per sq. inch gauge, for example, after the manner set forth in U. S. Patent 2,167,698 issued to R. S. Vose on August 1, 1939, or in U. S. Patent 2,167,655, issued to E. J. Houdry et al. on the same date. Alternativeily, the catalyst in suitable comminuted or granulated condition may be flowed through the reaction zone concurrently with or countercurrently to the flow of hydrocarbon reactants.

The present application is in part a continuation of my copending application Serial No. 310,762, filed December 23, 1939.

I claim as my invention:

1. Process of producing gasoline from hydrocarbon fractions heavier than gasoline comprising cracking such fractions in the presence of a catalyst consisting of silica, alumina, and zirconia prepared by calcination of a composite prepared by interaction of a sol containing silica, alumina and alkali metal, a zirconium compound, and a compound containing an anion of a non-atmospheric element in amount equivalent to at least 0.2 the total alkali metal oxide content of the sol, and removing alkali metal from the resulting composite of silica, alumina and zirconia by drying to the dried gel state and then base exchanging with a volatile or heat unstable cation.

2. Process of producing gasoline from ordinarily liquid hydrocarbon fractions comprising cracking such fractions in the presence of a catalyst prepared by calcination at temperature of at least 700° F. of a composite of silica, alumina and zirconia obtained by subjecting a zeolite to mild treatment with acid and freeing the same of alkali metal, said zeolite having been obtained by the drying of a mixture of hydrous oxides and alkali metal cation.

3. Process according to claim 2 further characterized in that the acid treatment is effected with an acid-reacting solution which simultaneously deposits hydrous zirconia on the zeolite.

4. The process of effecting hydrocarbon conversion reactions which comprises contacting a normally liquid hydrocarbon fraction under vapor phase cracking conditions with a calcined composite produced by the drying of a mixture of the hydrous oxides of silica, alumina and zirconia containing alkali metal whereby upon drying a base exchange composite is produced, and by base exchanging alkali metal in said dried mixture for a volatile cation, and by calcination of the dried base exchanged body.

JOHN R. BATES.

CERTIFICATE OF CORRECTION.

Patent No. 2,375,756.　　　　　　　　　　　　　　　May 15, 1945.

JOHN R. BATES.

It is hereby certified that error appears in the printed specification of the above numbered patent requiring correction as follows: Page 1, second column, line 41, for "hydrogels of" read --hydrogels or--; page 5, first column, line 29, for "and point" read --end point--; line 56, for "C. E. R." read --C. F. R.--; page 6, first column, line 21, for "ZrOCL$_2$.8H$_2$O" read --ZrOCl$_2$.8H$_2$O--; line 46, for "parts" read --portions--; line 51, for "octaine" read --octane--; and second column, line 7, for "catalysts" read --catalysis--; line 33, for "respective" read --responsive--; line 53, for "1938" read --1939--; line 63, for "Alternativeily" read --Alternatively--; page 7, first column, line 5, for "non-atmospheric" read --non-amphoteric--; and that the said Letters Patent should be read with this correction therein that the same may conform to the record of the case in the Patent Office.

Signed and sealed this 21st day of August, A. D. 1945.

Leslie Frazer (Seal)　　　　　　　　　　　　　　　First Assistant Commissioner of Patents.

conia prepared by calcination of a composite prepared by interaction of a sol containing silica, alumina and alkali metal, a zirconium compound, and a compound containing an anion of a non-atmospheric element in amount equivalent to at least 0.2 the total alkali metal oxide content of the sol, and removing alkali metal from the resulting composite of silica, alumina and zirconia by drying to the dried gel state and then base exchanging with a volatile or heat unstable cation.

2. Process of producing gasoline from ordinarily liquid hydrocarbon fractions comprising cracking such fractions in the presence of a catalyst prepared by calcination at temperature of at least 700° F. of a composite of silica, alumina and zirconia obtained by subjecting a zeolite to mild treatment with acid and freeing the same of alkali metal, said zeolite having been obtained by the drying of a mixture of hydrous oxides and alkali metal cation.

3. Process according to claim 2 further characterized in that the acid treatment is effected with an acid-reacting solution which simultaneously deposits hydrous zirconia on the zeolite.

4. The process of effecting hydrocarbon conversion reactions which comprises contacting a normally liquid hydrocarbon fraction under vapor phase cracking conditions with a calcined composite produced by the drying of a mixture of the hydrous oxides of silica, alumina and zirconia containing alkali metal whereby upon drying a base exchange composite is produced, and by base exchanging alkali metal in said dried mixture for a volatile cation, and by calcination of the dried base exchanged body.

JOHN R. BATES.

CERTIFICATE OF CORRECTION.

Patent No. 2,375,756.                                          May 15, 1945.

JOHN R. BATES.

It is hereby certified that error appears in the printed specification of the above numbered patent requiring correction as follows: Page 1, second column, line 41, for "hydrogels of" read --hydrogels or--; page 5, first column, line 29, for "and point" read --end point--; line 56, for "C. E. R." read --C. F. R.--; page 6, first column, line 21, for "ZrOCL$_2$.8H$_2$O" read --ZrOCl$_2$.8H$_2$O--; line 46, for "parts" read --portions--; line 51, for "octaine" read --octane--; and second column, line 7, for "catalysts" read --catalysis--; line 33, for "respective" read --responsive--; line 53, for "1938" read --1939--; line 63, for "Alternativeily" read --Alternatively--; page 7, first column, line 5, for "non-atmospheric" read --non-amphoteric--; and that the said Letters Patent should be read with this correction therein that the same may conform to the record of the case in the Patent Office.

Signed and sealed this 21st day of August, A. D. 1945.

Leslie Frazer (Seal)                                    First Assistant Commissioner of Patents.